US011433800B2

(12) United States Patent
Michie

(10) Patent No.: US 11,433,800 B2
(45) Date of Patent: Sep. 6, 2022

(54) ARTICLE CARRIER TRACK SYSTEM

(71) Applicant: JAC Products, Inc., Saline, MI (US)

(72) Inventor: Gordon Michie, LaSalle (CA)

(73) Assignee: JAC Products, Inc., Saline, MI (US)

( * ) Notice: Subject to any disclaimer, the term of this patent is extended or adjusted under 35 U.S.C. 154(b) by 96 days.

(21) Appl. No.: 17/124,547

(22) Filed: Dec. 17, 2020

(65) Prior Publication Data

US 2021/0188150 A1 Jun. 24, 2021

Related U.S. Application Data

(60) Provisional application No. 62/951,132, filed on Dec. 20, 2019.

(51) Int. Cl.
*B60P 7/08* (2006.01)
*F16B 37/04* (2006.01)

(52) U.S. Cl.
CPC .......... *B60P 7/0815* (2013.01); *F16B 37/045* (2013.01)

(58) Field of Classification Search
CPC ...... B60P 7/0815; F16B 37/0045; B60R 9/04; B60R 9/00
USPC ......... 410/104; 296/210; 224/309, 322, 325, 224/321, 315
See application file for complete search history.

(56) References Cited

U.S. PATENT DOCUMENTS

| | | | |
|---|---|---|---|
| 2,373,812 | A | 4/1945 | Coop |
| 4,295,588 | A | 10/1981 | Kowalski et al. |
| 4,364,500 | A | 12/1982 | Bott |
| 4,448,337 | A | 5/1984 | Cronce |
| 4,469,261 | A | 9/1984 | Stapleton et al. |
| 4,500,020 | A | 2/1985 | Rasor |
| 4,588,102 | A | 5/1986 | Kasugai |
| 4,588,117 | A | 5/1986 | Bott |
| 4,678,097 | A | 7/1987 | Crute |

(Continued)

FOREIGN PATENT DOCUMENTS

| | | |
|---|---|---|
| EP | 0913297 A2 | 5/1999 |
| GB | 108532 A | 8/1917 |
| JP | 3479608 B2 | 12/2003 |

*Primary Examiner* — D Glenn Dayoan
*Assistant Examiner* — Sunsurraye Westbrook
(74) *Attorney, Agent, or Firm* — Harness, Dickey & Pierce, P.L.C.

(57) ABSTRACT

The present disclosure relates to an article securing system for a motor vehicle. The system has a linear track having a generally C-shaped configuration which is secured to the vehicle. The track has a pair of inwardly projecting flanges which are spaced apart to form a linear slot, and a pair of interstitial spaces adjacent the flanges. The spacing between the flanges forms a first dimension. A load restraining component is included which has a base portion with a neck portion extending therefrom. The neck portion has a second dimension slightly less than the first dimension such that minimal play exists between the neck portion and the flanges of the track. A T-shaped clamping element is included which has a neck portion configured to engage with the base portion, and a pair of spaced apart teeth configured to fit within the interstitial spaces of the track. Tightening of the clamping element clamps the base portion to the track, and the neck portion and the teeth cooperate to prevent deformation of the flanges as the clamping element and the base portion are tightened to one another.

19 Claims, 5 Drawing Sheets

(56) References Cited

U.S. PATENT DOCUMENTS

| | | | |
|---|---|---|---|
| 4,768,691 A | 9/1988 | Stapleton | |
| 4,854,471 A | 8/1989 | Kasugai et al. | |
| 4,911,348 A | 3/1990 | Rasor et al. | |
| 4,913,303 A | 4/1990 | Harris | |
| 4,982,886 A | 1/1991 | Cucheran | |
| 5,069,377 A | 12/1991 | Baughman | |
| 5,190,198 A | 3/1993 | Cucheran | |
| 5,205,453 A | 4/1993 | Pudney et al. | |
| 5,449,086 A | 9/1995 | Harris | |
| 5,553,761 A | 9/1996 | Audoire et al. | |
| 5,579,970 A | 12/1996 | Cucheran et al. | |
| 5,704,524 A | 1/1998 | Stapleton | |
| 5,794,826 A | 8/1998 | Cronce et al. | |
| 5,826,765 A | 10/1998 | Rak | |
| 5,913,465 A | 6/1999 | Potter et al. | |
| 6,070,774 A | 6/2000 | Rak et al. | |
| 6,182,876 B1 * | 2/2001 | Moliner | B60R 9/058 224/322 |
| 8,789,732 B2 * | 7/2014 | Aftanas | B60R 9/04 224/326 |
| 9,643,542 B2 * | 5/2017 | Aftanas | B60R 9/058 |
| 10,035,467 B2 * | 7/2018 | Flaherty | B60R 9/048 |

* cited by examiner

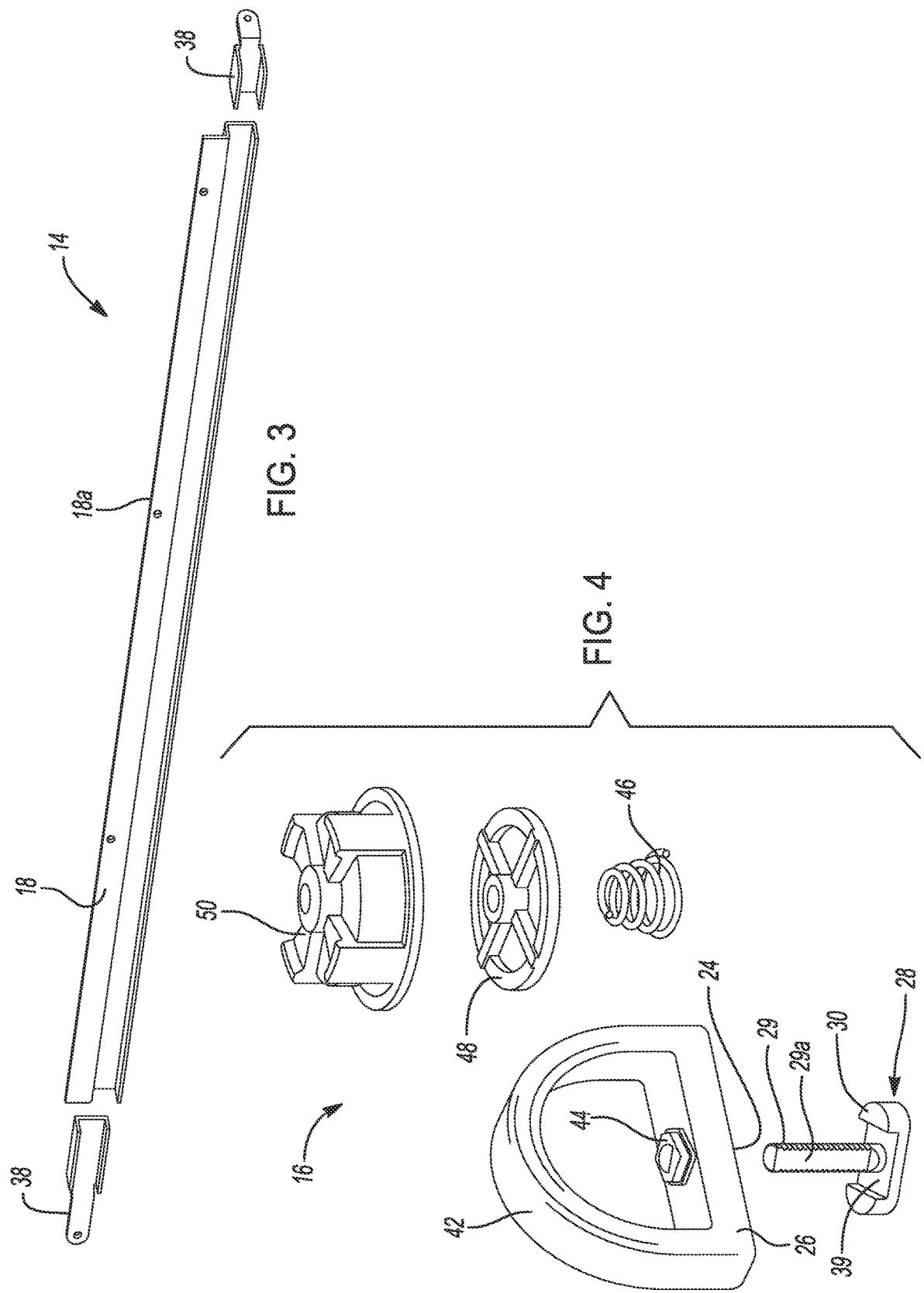

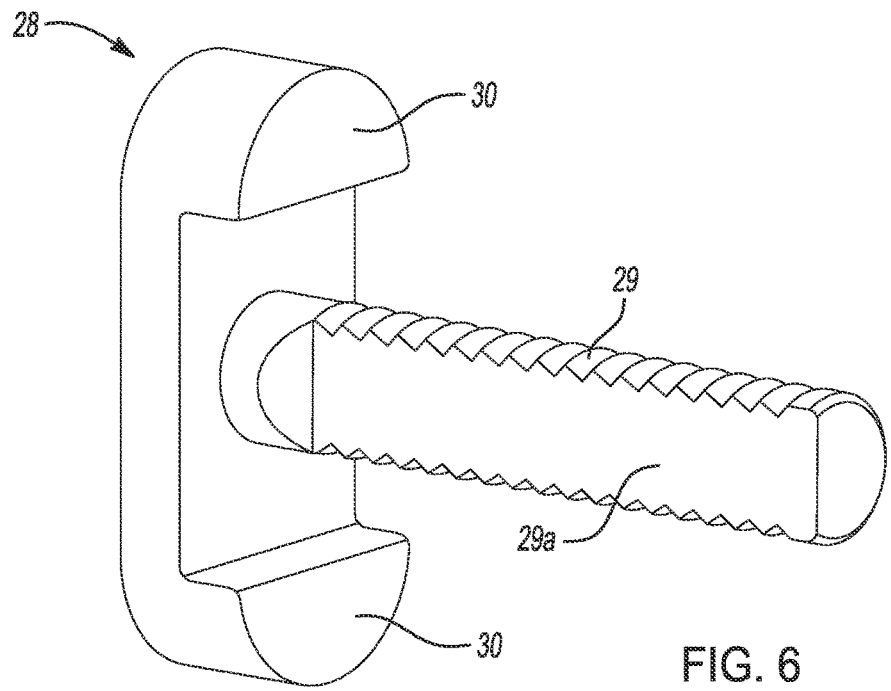
FIG. 6
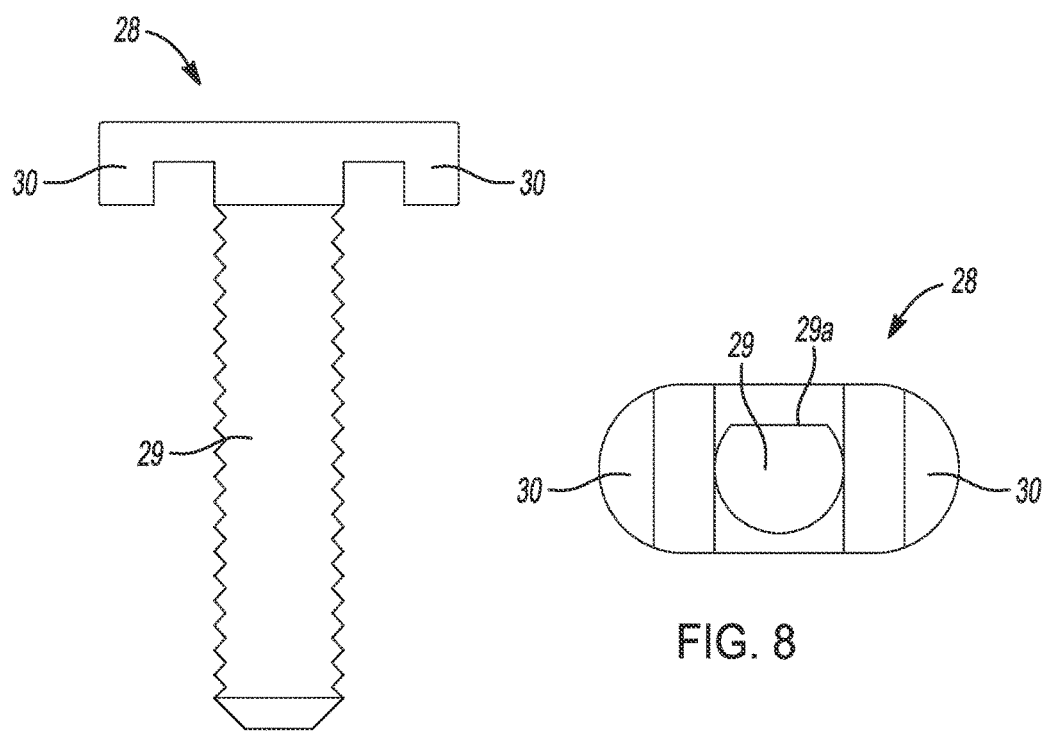
FIG. 7
FIG. 8

US 11,433,800 B2

ARTICLE CARRIER TRACK SYSTEM

CROSS REFERENCE TO RELATED APPLICATIONS

This application claims the benefit of U.S. Provisional Application No. 62/951,132, filed on Dec. 20, 2019. The entire disclosure of the above application is incorporated herein by reference.

FIELD

The present disclosure relates to article carrier systems, and more particularly to an article carrier track system which is especially well suited for use in a bed of pickup truck, and which has an increased load carrying capacity beyond what would normally be expected from the materials used.

BACKGROUND

The statements in this section merely provide background information related to the present disclosure and may not constitute prior art.

Article carriers have been used on motor vehicles (e.g., sedans, SUVs, mini-vans, full-size vans and pickup trucks) for many years. Typically such article carriers include two support rails or tracks which are fixedly secured to an outer surface of the vehicle. One or more cross bars may be releasably or adjustably coupled to the support rails or tracks and used to support articles thereon, or even to restrain loads from moving (e.g., loads being carried within a bed of a pickup truck). Also, one or more adjustable tie-down components may be positioned in the tracks and adjustably positionable along the tracks for use with external rubber straps, bungee cords, etc., to help restrain loads.

Generally speaking, increasing the load carrying ability of the article carrier system has meant increasing the thickness and weight of the materials used, for example the wall thickness and weight of the support rails or tracks. The tracks typically need to be made with a material of sufficient strength and thickness to prevent the tracks from unfolding when a high pulling load is placed on the track via the component attached to the track (e.g., a tie-down assembly clamped to the track). However, with present day motor vehicle manufacturers, there is also a strong interest in reducing the overall weight of the vehicle. As such, simply using heavier components for the article carrier system in order to gain added load carrying/restraining capability is not a favorable option, as such would increase the overall weight of the vehicle.

Accordingly, there remains a strong interest in new support rail and tie-down assembly constructions for an article carrier system which can provide a suitable level of load carrying and/or article restraining capacity while reducing the weight of the article carrier components.

SUMMARY

This section provides a general summary of the disclosure, and is not a comprehensive disclosure of its full scope or all of its features.

In one aspect the present disclosure relates to an article securing system for a motor vehicle. The system may comprise an elongated linear track having a generally C-shaped configuration. The track may include a pair of inwardly projecting flanges, with the flanges spaced apart to form a linear slot along the track. The track may also include a pair of interstitial spaces adjacent the inwardly projecting flanges. A spacing between the flanges forms a first dimension. A load restraining component may be included which has a base portion with a neck portion extending from the base portion. The neck portion has a second dimension slightly less than the first dimension such that minimal play exists between the neck portion and the flanges of the track. A T-shaped clamping element may also be included which has a neck portion configured to engage with the base portion of the load restraining component. The T-shaped clamping element may also have a pair of spaced apart teeth configured to fit within the interstitial spaces of the track. Tightening of the T-shaped clamping element operates to clamp the base portion to the track, and the neck portion and the teeth cooperate to prevent deformation of the flanges as the T-shaped clamping element and the base portion are tightened to one another.

In another aspect the present disclosure relates to an article securing system for a motor vehicle. The system may comprise an elongated linear track having a generally C-shaped configuration. The track may include a pair of inwardly projecting parallel flanges, with the flanges spaced apart to form a linear slot along the track. The track may also include a pair of interstitial spaces adjacent the inwardly projecting flanges. A spacing between the flanges forms a first dimension. A load restraining component may be included which has a base portion with a neck portion extending from the base portion. The neck portion has a second dimension slightly less than the first dimension such that the neck portion fits between the flanges with minimal play between the neck portion and the flanges. The base portion is configured to rest against planar surfaces of the track adjacent the flanges when the base portion is tightened against the track. A T-shaped clamping element is included which has a neck portion configured to engage with the base portion of the load restraining component. The t-shaped clamping element further may include a pair of spaced apart teeth configured and dimensioned to fit within the interstitial spaces of the track, closely adjacent surfaces of the flanges when the T-shaped clamping element is tightened against the flanges of the track. Tightening of the T-shaped clamping element operates to clamp the base portion to the track, and the neck portion and the teeth cooperate to prevent deformation of the flanges as the T-shaped clamping element and the base portion are tightened to one another.

In still another aspect the present disclosure relates to an article securing system for a motor vehicle. The system may comprise an elongated linear track having a generally C-shaped configuration and including a pair of inwardly projecting parallel flanges. The flanges may be spaced apart to form a linear slot along the track. The track may also include a pair of interstitial spaces adjacent the inwardly projecting flanges. A spacing between the flanges forms a first dimension. A load restraining component may be included which has a base portion with a neck portion extending from the base portion. The neck portion has a second dimension slightly less than the first dimension such that the neck portion fits between the flanges with minimal play between the neck portion and the flanges. The base portion is configured to rest against planar surfaces of the track adjacent the flanges when the base portion is tightened against the track. A T-shaped clamping element has a neck portion including a flat surface portion, and is configured to engage with the base portion of the load restraining component. The T-shaped clamping element may also include a pair of spaced apart teeth having flat surfaces configured and dimensioned to fit within the interstitial spaces of the track, closely adjacent surfaces of the flanges, when the T-shaped clamping element is tightened against the flanges of the track. Tightening of the T-shaped clamping element operates to clamp the base portion to the track, and the neck portion and the teeth cooperate to prevent deformation of the flanges as the T-shaped clamping element and the base portion are tightened to one another. In addition, the load restraining component comprises an opening having a shape complementary to a cross sectional shape of the neck portion of the T-shaped clamping element, for receiving the neck portion of the T-shaped clamping element, while restraining the neck portion of the T-shaped clamping element against rotational movement when the T-shaped clamping element is tightened to the load restraining component.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

FIG. 3 is a perspective view of one track shown in FIG. 1;

FIG. 4 is an exploded view of the construction of the tie-down assembly;

FIG. 6 is an enlarged perspective view of just the clamping element;

FIG. 7 is an enlarged side view of the clamping element of FIG. 6; and

FIG. 8 is a bottom view of the clamping element of FIG. 7.

DETAILED DESCRIPTION

Example embodiments will now be described more fully with reference to the accompanying drawings.

Figure 1:
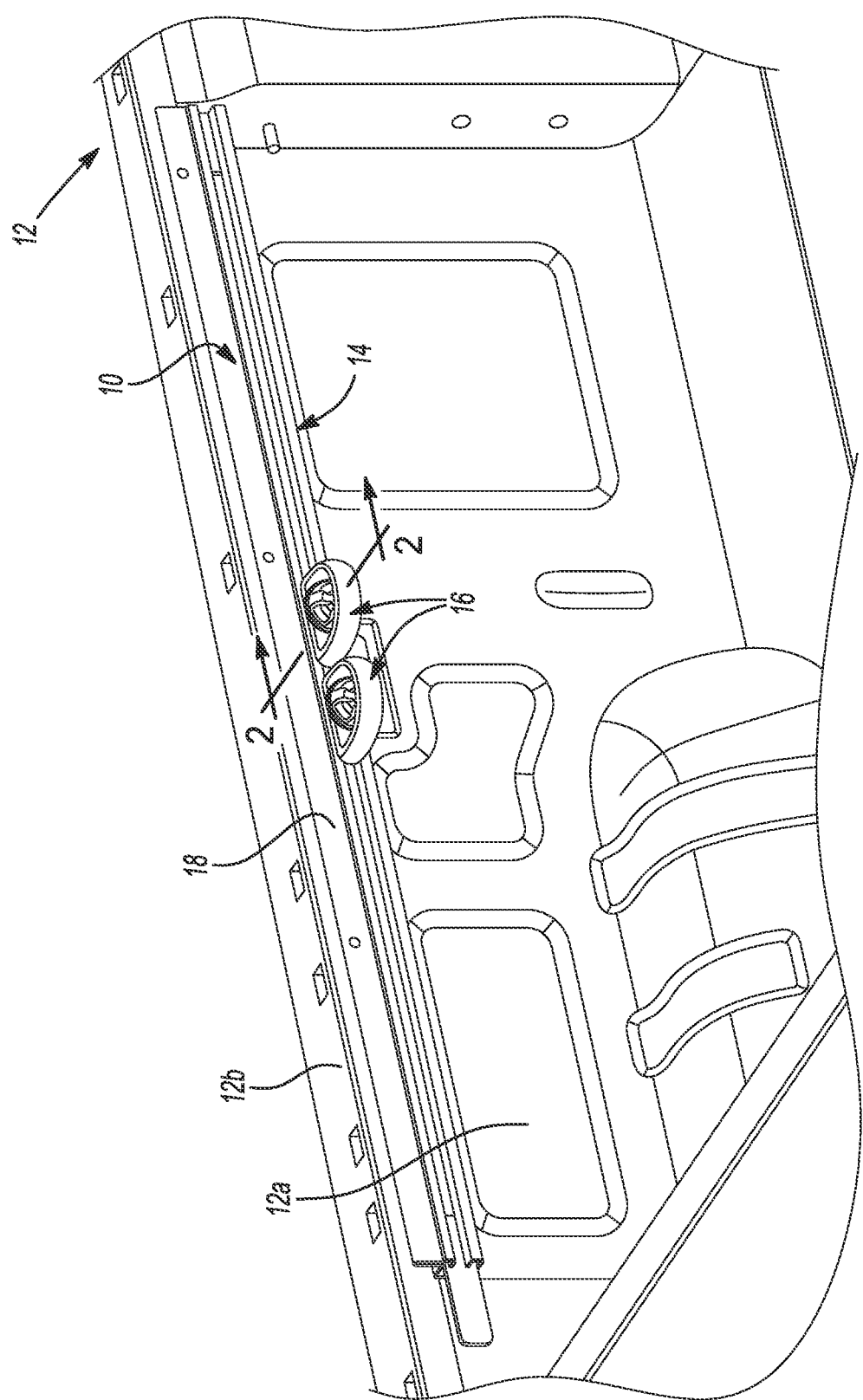
FIG. 1 is a partial perspective view of a vehicle article carrier of the present disclosure being implemented in a bed of a pickup truck.

Referring to FIG. 1 there is shown an article carrier track system 10 in accordance with one embodiment of the present disclosure. The system 10 is shown in FIG. 1 installed in a bed 12a of a pickup truck 12, but it could be installed on a roof of a sedan, SUV, van or mini-van, or even at other locations on a vehicle. As such, FIG. 1 should only be interpreted as showing one example of a suitable location/installation of the system 10.

The system 10 in this example includes a pair of formed tracks 14 (only one being visible in the figure) that are secured parallel to one another by suitable fasteners (e.g., threaded bolt/nut fasteners) to the opposing walls 12b of the truck bed 12a. One or more tie-down assemblies 16 are releasably coupled to the tracks 14 and adjustably positionable along the tracks. The tie-down assemblies 16 are used to accept straps, bungee cords or any other securing implement to help secure articles within the truck bed 12a and to prevent movement of articles, for example heavy articles, within the truck bed.

Figure 2:
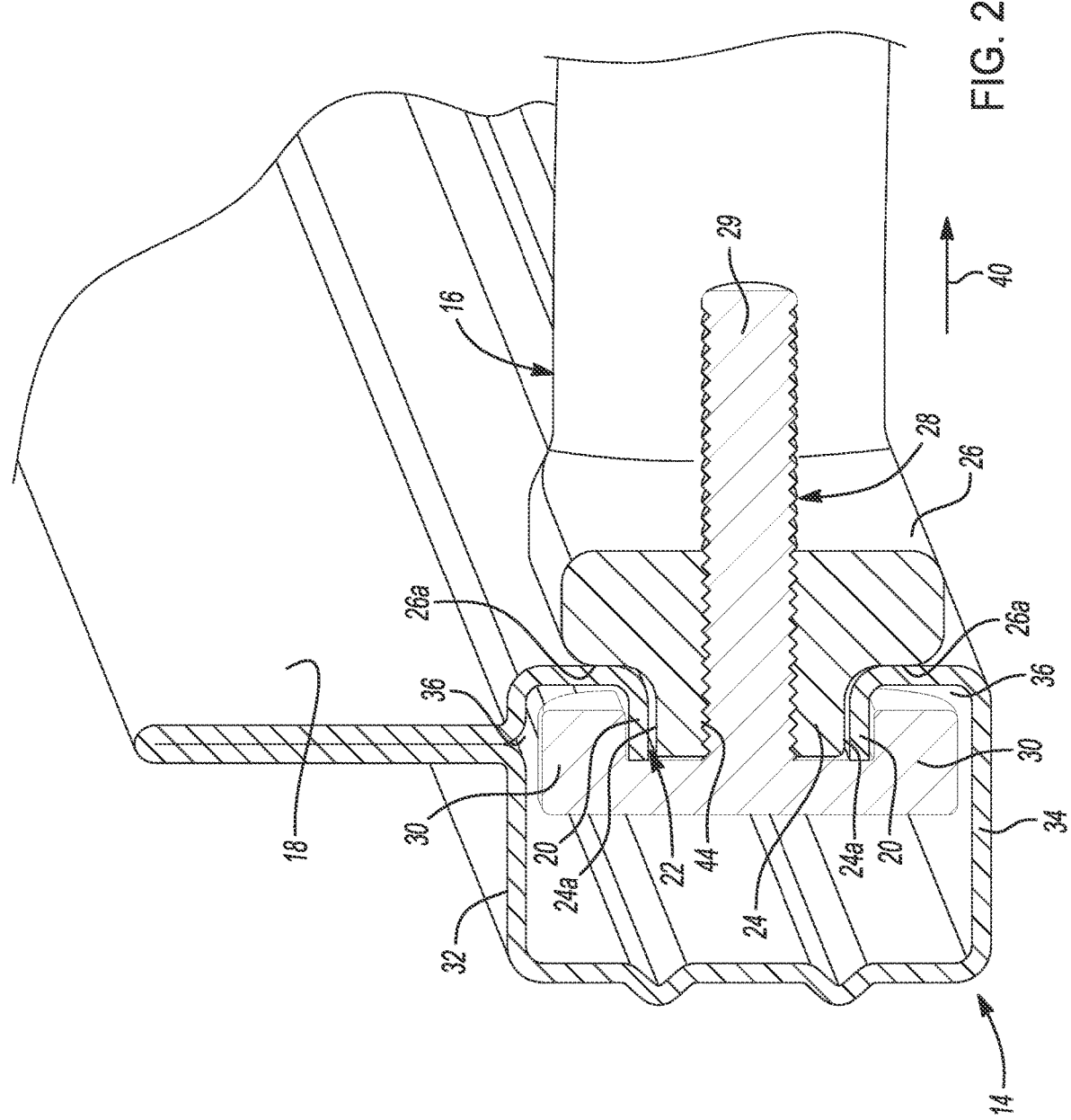
FIG. 2 is a cross-sectional view of one tie-down assembly secured to one of the tracks shown in FIG. 1, taken in accordance with section line 2-2 in FIG. 1.

FIG. 2 shows a cross section of one track 14 in accordance with section line 2-2 in FIG. 1. The tracks 14 in this example are identical, although it is possible that one track may include additional features or structure that the other does not have; as such they need not necessarily be perfectly identical in construction, but for the following discussion it will be assumed that the tracks 14 are identical in construction. The track 14 may be a roll-formed structure, or may be formed by an extrusion process, or any other suitable process, and the present disclosure is not limited to forming the track 14 with any specific manufacturing technique. In this example the track 14 forms a C-shaped configuration having a laterally projecting mounting flange 18. The mounting flange 18 has a plurality of openings 18a to enable mounting the track 14 along the bed sidewall 12b. A pair of inwardly projecting flanges 20 define a linear slot or opening 22 along a full length of the track 14. The linear slot 22 is sized to receive a neck portion 24 of a base portion 26 of the tie-down assembly 16. The neck portion 24 includes two flat surfaces 24a and is closely dimensioned to be just slightly smaller (e.g., one or a few millimeters) than the width of the linear opening 22. This enables the neck portion 24 to fit within the linear opening 22 with little play when surfaces. A T-shaped clamping element 28 is carried on the base portion 26 and has a different construction from a conventional clamping element used with previously developed clamping elements. The clamping element 28 has a shaft portion 29 having two spaced apart teeth 30. Importantly, the teeth 30 are sized to substantially fill the internal spaces 36 between the flanges 20 and upper and lower walls 32 and 34 of the track 14, while still allowing easy sliding movement of the tie-down assembly 16 when it is loosened and needs to be repositioned along the track 14.

When the clamping element 28 is tightened (drawn to the right in FIG. 2), this clamps the base portion 26 of the tie-down assembly 16 tightly to the track 14. The track 14 also preferably includes a plurality of spaced apart notches (not visible in the figure) along its length which can be used to define specific longitudinal locations along the track 14 where the clamping element 28 can engage and be positively prevented from moving once it is in its clamped orientation.

The cooperation of the clamping element 28, the flanges 20 of the track 14, and the neck portion 24 of the base portion 26, along with the tight dimensional tolerances between these components, enables an especially strong, synergistic, "interlocking" coupling to be made between the formed track 14 and the base portion 26 of the tie-down assembly 16. This "interlocking" coupling effectively helps to prevent a pulling load exerted on the clamping element 28 from unfolding the track 14 (i.e., pulling the flanges 20 outwardly as a pulling load is placed on the tie-down assembly in the direction of arrow 40 in FIG. 2). Effectively, this enables the flanges 20 to be trapped or locked between the teeth 30 of the clamping element 28 and the flat surfaces 24a of the neck portion 24 of the clamping element 28. This interlocking coupling enables the system 10 to handle higher loads without adding thickness and weight to the track 14 or the tie-down assembly 16. Without the interlocking coupling effected by the track 14, the clamping element 26 and its teeth 30, and the neck portion 24 of the tie-down assembly 16, the track 14 would need to be made with a thicker wall portion to be able to withstand high loads applied in the direction of arrow 40.

The interlocking configuration of the clamping element 28, the flanges 20, and the teeth 30 of the clamping element 28, significantly helps to prevent unfolding of the track 14 in response to a high force applied in the direction of arrow 40. In effect, this interlocking action, as well as the operation of the teeth 30 filling the spaces 36 adjacent to the opposite surfaces of the flanges 20, helps to maintain the structural integrity of the track 14 so that the track maintains its C-shape even under high pulling loads, for example a pulling load of 250 kg applied in the direction of arrow 40. Without this interlocking structure described above, for example, significantly thicker wall construction would be needed for the track 14 to meet any given pulling load requirement without beginning to unfold. The interlocking construction described above can thus provide any given load performance with a thinner wall structure for the track 14 than would be possible with a conventional track/clamping element design, which advantageously enables the track 14 to be made lighter.

The track 14 is also shown in FIG. 3. End caps 38 may be inserted into each end of the track and then secured to portions of the truck bed sidewalls 12b to further ensure against movement and/or flexing of the track 14 once it is fully installed on the bed sidewall. Holes 18a are visible in the flange 18, which may be used with external threaded nut/bolt fasteners to secure the track 14 to the bed sidewall 12b. The track 14 in one example may be roll-formed from a single length of high strength material, for example aluminum, stainless steel, etc. However, as noted above, the track 14 may also be extruded or formed by another other suitable manufacturing operation.

Figure 5:
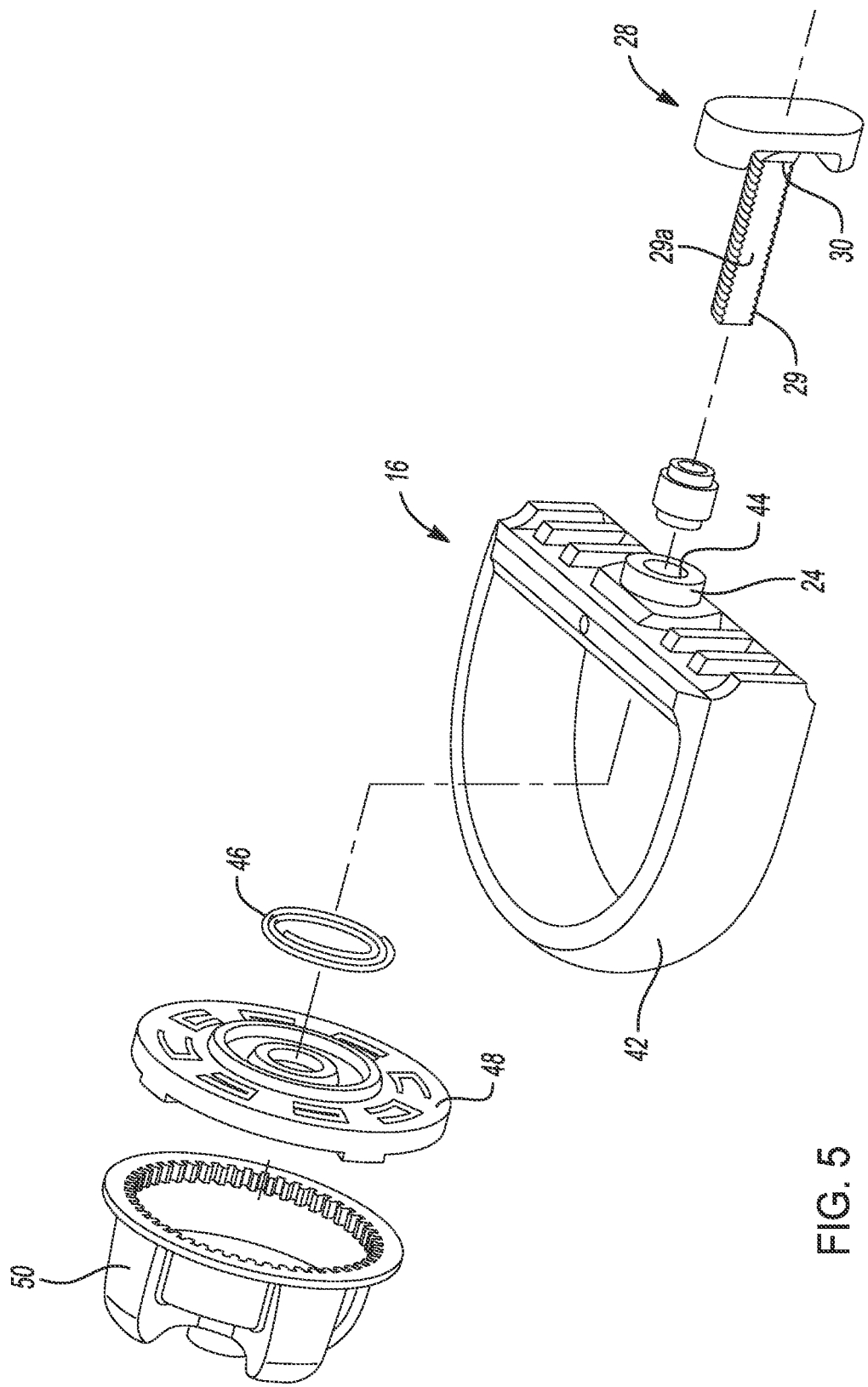
FIG. 5 is another exploded perspective view of the tie-down assembly of FIG. 4.

FIGS. 4 and 5 show exploded views of the tie-down assembly 16. The tie-down assembly 16 includes the base portion 26 having an integrally formed loop 42 extending therefrom. The base portion may be made from a suitable high strength material, for example high strength plastic or even a suitable strong metal. The loop 42 can receive any form of strap, rope, nylon cord, rubber cord, bungee cord, etc., for helping to secure articles stationary within the truck bed 12a. The base portion 26 includes an opening 44 through which the neck portion 29 of the clamping element 28 extends. The clamping element 28 is shown in greater detail in FIGS. 6-8. The neck portion 29 of the clamping element 28 is threaded and includes a flat surface 29a, and the opening 44 includes a correspondingly shaped opening so that the clamping element 28 cannot rotate as it is being tightened. A coil spring 46 is positioned over the opening 44 and in line with a locking element 48 and a manually graspable, rotatable locking knob 50. The locking knob 50 and locking element 48 are used to receive the threaded neck 29 of the clamping element 28 and tighten the tie-down assembly 16 against the track 14. This construction also helps to prevent overtightening of the tie-down assembly 16 and is described in detail in U.S. Pat. No. 6,070,774 to Aftanas et al., issued Jun. 6, 2000, and assigned to JAC Products, Inc., the assignee of the present disclosure. The disclosure of U.S. Pat. No. 6,070,774 is hereby incorporated by reference into the present disclosure.

While the system 10 has been described in connection with the tie-down assembly 16, it will be appreciate that the construction described for the tie-down assembly could be just as readily applied to a load bar. As such, the present disclosure is not restricted to use with only tie-down assemblies but could just as readily be implemented in connection with a load bar that includes the same construction as described for the tie-down assembly 16. Importantly, the system 10 is able to handle even higher pulling loads without tangibly increasing the cost or weight of the various components of the system 10, and without tangibly increasing the overall complexity of the system 10.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An article securing system for a motor vehicle, the system comprising:
   an elongated linear track having a generally C-shaped configuration and including:
      a pair of inwardly projecting flanges, the flanges spaced apart to form a linear slot along the track;
      a pair of interstitial spaces adjacent the inwardly projecting flanges; and
      a spacing between the flanges forming a first dimension;
   a load restraining component having a base portion with a neck portion extending from the base portion, the neck portion having a second dimension slightly less than the first dimension such that minimal play exists between the neck portion and the flanges of the track; and
   a T-shaped clamping element having a neck portion configured to engage with the base portion of the load restraining component, and a pair of spaced apart teeth configured to fit within the interstitial spaces of the track; and
   wherein tightening of the T-shaped clamping element operates to clamp the base portion to the track, and the neck portion and the teeth cooperate to prevent deformation of the flanges as the T-shaped clamping element and the base portion are tightened to one another.

2. The apparatus of claim 1, wherein the load restraining component comprises a tie-down assembly for accepting a tie down strap thereto.

3. The apparatus of claim 1, wherein the neck portion of the load restraining component comprises an opening for receiving the neck portion of the clamping element.

4. The apparatus of claim 3, wherein the neck portion of the clamping element includes a flat surface, and the opening in the load restraining component similarly includes a correspondingly shaped flat surface, to prevent rotation of the neck portion of the clamping element as it is being tightened to the base portion of the load restraining component.

5. The apparatus of claim 4, wherein claim the load restraining component further includes:
   a coil spring;
   a locking knob;
   a locking element disposed between the coil spring and the locking know; and
   wherein the locking knob and the locking element are configured to receive the neck of the clamping element and tighten the clamping element to the load restraining component.

6. The apparatus of claim 1, further comprising at least one end cap configured to be inserted into one end of the track to close off the one end.

7. The apparatus of claim 1, further comprising a pair of end caps configured to be inserted into opposing ends of the track to close off the opposing ends.

8. The apparatus of claim 1, wherein the load restraining component comprises a tie-down assembly having:
   a loop extending from the base portion;
   a coil spring;
   a locking element having a first surface disposed adjacent the coil spring;
   a rotatable locking knob disposed against a second surface of the locking element; and
   the locking element and the rotatable locking knob being used to engage the neck of the clamping element to tighten the clamping element and the base portion of the against the track.

9. The apparatus of claim 1, wherein the track comprises a roll formed track formed from at least one of stainless steel or aluminum.

10. The apparatus of claim 1, wherein the first dimension and the second dimension differ by a two millimeters or less.

11. The apparatus of claim 1, wherein the track includes a mounting flange extending along a major portion of a length thereof, and wherein the mounting flange includes a plurality of openings for receiving external fastening elements to enable securing the track to a portion of the vehicle.

12. An article securing system for a motor vehicle, the system comprising:
   an elongated linear track having a generally C-shaped configuration and including:
      a pair of inwardly projecting parallel flanges, the flanges spaced apart to form a linear slot along the track;
      a pair of interstitial spaces adjacent the inwardly projecting flanges; and
      a spacing between the flanges forming a first dimension;
   a load restraining component having a base portion with a neck portion extending from the base portion, the neck portion having a second dimension slightly less than the first dimension such that the neck portion fits between the flanges with minimal play between the neck portion and the flanges, and the base portion configured to rest against planar surfaces of the track adjacent the flanges when the base portion is tightened against the track;
   a T-shaped clamping element having a neck portion configured to engage with the base portion of the load restraining component, and a pair of spaced apart teeth configured dimensioned to fit within the interstitial spaces of the track, closely adjacent surfaces of the flanges, when the T-shaped clamping element is tightened against the flanges of the track; and
   wherein tightening of the T-shaped clamping element operates to clamp the base portion to the track, and the neck portion and the teeth cooperate to prevent deformation of the flanges as the T-shaped clamping element and the base portion are tightened to one another.

13. The apparatus of claim 12, wherein the track comprises a formed track comprised of at least one of stainless steel or aluminum.

14. The apparatus of claim 12, wherein the neck portion of the T-shaped clamping element comprises:
   a flat surface portion;

and the load restraining component comprises an opening having a shape complementary to a cross sectional shape of the neck portion of the T-shaped clamping element, for receiving the neck portion of the T-shaped clamping element while restraining the neck portion of the T-shaped clamping element against rotational movement when the T-shaped clamping element is tightened to the load restraining component.

15. The apparatus of claim 12, wherein the first dimension differs from the second dimension by two millimeters or less.

16. The apparatus of claim 12, wherein surfaces of the spaced apart teeth extend parallel to inside surfaces of the flanges.

17. The apparatus of claim 12, wherein the load restraining component includes a loop portion for engaging with an external load securing strap.

18. An article securing system for a motor vehicle, the system comprising:
  an elongated linear track having a generally C-shaped configuration and including:
    a pair of inwardly projecting parallel flanges, the flanges spaced apart to form a linear slot along the track;
    a pair of interstitial spaces adjacent the inwardly projecting flanges; and
    a spacing between the flanges forming a first dimension;
  a load restraining component having a base portion with a neck portion extending from the base portion, the neck portion having a second dimension slightly less than the first dimension such that the neck portion fits between the flanges with minimal play between the neck portion and the flanges, and the base portion configured to rest against planar surfaces of the track adjacent the flanges when the base portion is tightened against the track;
  a T-shaped clamping element having a neck portion including a flat surface portion, and configured to engage with the base portion of the load restraining component, and a pair of spaced apart teeth having flat surfaces configured and dimensioned to fit within the interstitial spaces of the track, closely adjacent surfaces of the flanges, when the T-shaped clamping element is tightened against the flanges of the track; and
  wherein tightening of the T-shaped clamping element operates to clamp the base portion to the track, and the neck portion and the teeth cooperate to prevent deformation of the flanges as the T-shaped clamping element and the base portion are tightened to one another; and
  wherein the load restraining component comprises an opening having a shape complementary to a cross sectional shape of the neck portion of the T-shaped clamping element, for receiving the neck portion of the T-shaped clamping element while restraining the neck portion of the T-shaped clamping element against rotational movement when the T-shaped clamping element is tightened to the load restraining component.

19. The apparatus of claim 18, wherein the track further comprises a mounting flange including a plurality of openings for receiving fastening implements for securing the track to the vehicle.

\* \* \* \* \*